Patented July 15, 1924.

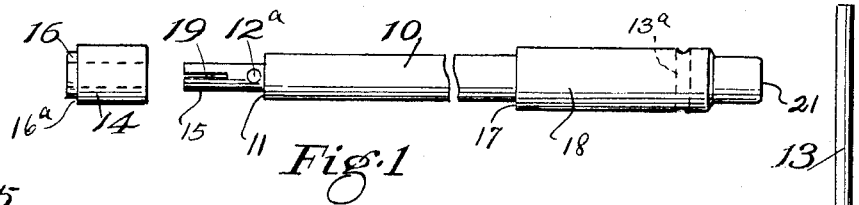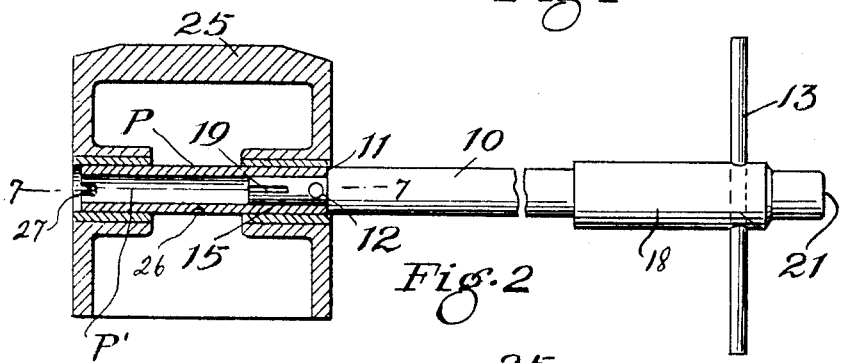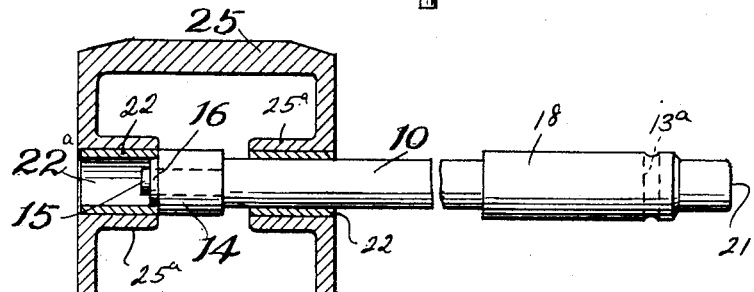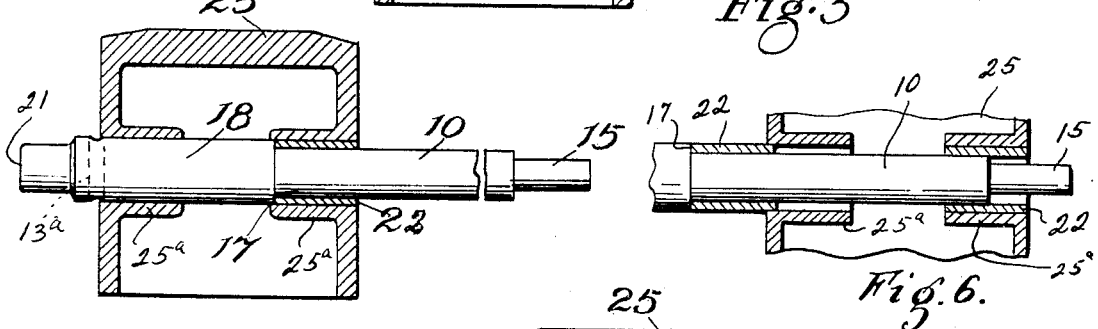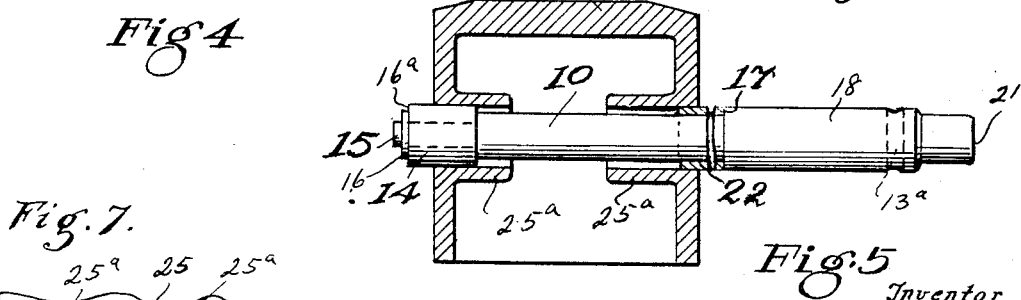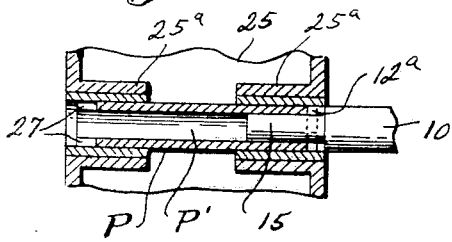

1,501,815

UNITED STATES PATENT OFFICE.

ALFRED BRUNO SEPPMANN, OF LAKE CRYSTAL, MINNESOTA.

PISTON-BUSHING EXTRACTOR AND REPLACER.

Application filed April 23, 1923. Serial No. 634,037.

*To all whom it may concern:*

Be it known that I, ALFRED B. SEPPMANN, a citizen of the United States, residing at Lake Crystal, in the county of Blue Earth and State of Minnesota, have invented certain new and useful Improvements in Piston-Bushing Extractors and Replacers, of which the following is a specification, reference being had to the accompanying drawings.

This invention relates to piston pin and bushing extractors and replacers.

An important object of the invention is to provide a single tool performing all of the operations necessary to the removal from a piston not only of the piston pin but the bushings thereof and likewise adapted to replace the removed pin and bushings by new ones.

A further object of the invention is to provide a device of this character whereby misalignment of the bushings or buckling thereof in inserting the new bushings is effectually prevented.

A still further object of the invention is to provide a device of this character having means whereby the lock pin receiving notch of a piston may be readily aligned with the piston so that the same may be engaged by the lock bolt of the connecting rod.

A still further object is to provide a device of this character which is simple in construction and arrangement, readily operated, durable in service and a general improvement in the art.

These and other objects I attain by the construction shown in the accompanying drawings, wherein for the purpose of illustration is shown a preferred embodiment of my invention, and wherein like reference characters designate like parts throughout.

In the drawings:—

Figure 1 is a combined view showing the various parts of the tool;

Figures 2 to 6 inclusive are views showing various steps in the removal and replacement of the piston pin and bushings;

Figure 7 is a section on the line 7—7 of Figure 2.

Referring now more particularly to the drawings, the tool comprises a body portion 10 of a diameter having a sliding fit in the bore 22ª of a new bushing 22. At one end this body portion is provided with a reduced extension 15 of a diameter having a sliding fit in the bore P' of a piston P. The end of this reduced extension 15 is slotted, as indicated at 19, and slightly spread for a purpose presently to appear and this extension is provided adjacent the shoulder 11, formed at its juncture with the body portion 10, with an opening 12 for the reception of a short pin 12ª, the use of which will appear hereinafter. The extension 15 is adapted likewise for the seating of a removable arbor 14, having an external diameter such that it has a sliding fit in the bores of the piston bosses 25ª of the piston 25. This arbor is of slightly less length than the reduced extension 15 and when positioned upon the extension is held in position thereon by the friction of the split outer end of the extension, so that it does not readily drop therefrom in handling of the tool but at the same time may be readily applied thereto. The outer end of the arbor 14 is provided with a reduced extension 16, forming at its juncture with the body a shoulder 16ª. This reduction 16 is of a diameter having a sliding fit in the bore 22ª of a new bushing, in other words, of the same diameter as the body portion 10. The opposite end of the body portion 10 is provided with an enlarged extension 18 of a diameter having a sliding fit in the bores of the piston bosses 25ª, the juncture of the enlarged extension 18 with the body portion 10 forming a shoulder 17, the purpose of which will presently appear. The enlargement 18 is provided adjacent its outer end with an opening 13ª, adapted for the reception of a removable lever pin 13, and the outer face of the extension at such end forms an anvil 21 to which a hammer may be applied.

In use of the tool, assuming that it is desired to remove from a piston 25 a piston pin P and old or worn bushings 22, the first step, of course, is the removal of the piston pin. This is accomplished by inserting the reduced extension 15 in the bore P' of the piston pin and then tapping upon the face 21 of the tool, with the result that the piston pin is driven from the bushings and removed, the tool being shown properly positioned in Figure 2. After the pin is removed, to remove the bushings the arbor 14 of the tool is inserted between the piston bosses in alignment with the bores 22ª of the bushings 22 and the body portion 10 of the tool inserted through the bore of one of the bushings and the extension 15 thereof engaged in the bore of the arbor 14. The reduced extension 16 of the arbor 14 is now engaged in the bore of the other bushing 22 of the piston, so that the shoulder 16ª thereof abuts the inner end of this bushing. With the tool in this position it will be obvious that the tool is held accurately aligned with the bores of the bushings and with the bores of the piston bosses 25ª, so that when force is applied the bushing is driven outwardly from the boss in alignment with its axis and so does not bear upon the walls of the boss. Buckling of the inner end of the bushing is effectually prevented by the fact that the reduced extension of the arbor 14 of the tool is engaged in the bore thereof. Accordingly, the drifting operation necessary to the removal of the bushing is accomplished with as little resistance as is possible. This operation is clearly disclosed in Figure 3. One of the bushings having been removed and it being desired to remove the other of the bushings, the tool is inserted with the reduced extension 15 foremost through the bore of a piston boss 25ª, from which the bushing has been removed, until the body portion 10 thereof has passed through the bushing 22 to be removed and the shoulder 17 comes into engagement with the inner end of this bushing. The body portion 18 having a sliding fit in the bore of the piston boss and the body portion 10 having a sliding fit in the bushing 22, the tool is again held accurately aligned and buckling of the inner end of the bushing is prevented by the body portion 10, so that a hammer may be applied to the face 21 and the bushing removed with a minimum of resistance. This operation is clearly disclosed in Figure 4. The bushings having been removed and it being desired to replace the same by new bushings, a bushing 22 is placed upon the tool and upon the body portion 10 thereof, with the end thereof abutting the shoulder 17 at the juncture of the body portion with the enlargement 18. The arbor 14 is then placed in position and the tool with the arbor 14 foremost entered through one boss until this arbor engages in the bore of the other boss, at which time the end of the bushing will come into alignment with the opening, the tool being held in the proper alignment by the arbor 14. At this time pressure applied to the face 21 will seat the bushing in the proper position and without any danger of buckling the same during this seating operation. The bushing having been fully seated the tool is withdrawn, the arbor 14 being removed from the tool by its engagement with the inner end of the bushing. A second bushing is then applied to the tool and positioned as in the case of the first bushing and the tool inserted through the other of the bosses until the body portion 10 becomes engaged in the bore of the bushing 22 which has been inserted, at which time the tool is held in alignment for the seating of the second bushing. To this end it is necessary that the body portion 10 be of a length greater than the diameter of the piston with which the tool is being employed, being preferably of a length equal to this diameter plus one-half of the length of the bushings employed in the piston for which the tool is designed. By making this body portion of this length, the greatest possible aligning engagement is obtained. By making the body portion of this length, it will be obvious that during the insertion of the first bushing the arbor 14 will remain in engagement in the bore of the boss 25ª until the bushing being inserted has fully one-half of its length engaged, and when inserting the second bushing the body portion 10 will be engaged in the bushing already seated and one-half of the length of the bushing when the second bushing is being inserted. The step of insertion of the first bushing is shown in Figure 5 and that of the insertion of the second bushing in Figure 6. The length of the body portion 10 is best illustrated in the latter figure. Insertion of the pin P is ordinarily readily accomplished, these pins being formed of hardened steel and accordingly not being injured by the application of light blows of a hammer thereto to force the same in to the bushing. The only difficulty arising in inserting these piston pins is the alignment of the notch 26 of the pins with the piston in such manner that the ordinary retaining bolt, not herein shown, by means of which the connecting rod is attached to the piston pin may be inserted. This requires that the piston pin be rotated until this notch is properly aligned and in order that this may be readily accomplished the short pin 12ª hereinbefore mentioned is provided. As is well-known to those familiar with the art, the piston pins and particularly hollow piston pins are usually provided in their ends with notches 27, in which a special tool may be engaged for rotating the piston pin by inserting the reduced extension 15 of the tool in the end of the piston pin with a short pin 12ª of a diameter approximating the inner diameter of the bushing 22. This pin may be engaged in these notches 27 and with the lever pin 13 in position in the opening 13ª of the tool, the tool may be rotated to rotate the piston pin P, the engagement of the pin with the piston pin being clearly shown in Figure 7.

From the foregoing it is believed to be obvious that by the use of a tool constructed in accordance with my invention, the several operations of removing and replacing the bushings and piston pins of pistons are clearly facilitated and the destruction of the bushings in attempting to remove or insert the same is prevented. It will furthermore be obvious that the construction of the tool herein set forth is capable of some modification, without materially departing from the spirit of my invention, and I accordingly do not limit myself to such specific structure except as hereinafter claimed.

I claim:—

1. A tool for removing and replacing the piston pins and bushings of pistons, comprising a body portion of a diameter slidably engaging in the bore of the bushings with the piston, the body portion being provided at one end with a reduced extension of a diameter slidably engaging the bore of the piston pin, and at the opposite end with an enlarged extension of a diameter slidably engaging the bores of the piston bosses.

2. A tool for removing and replacing the piston pins and bushings of pistons, comprising a body portion of a diameter slidably engaging in the bore of the bushings with the piston, the body portion being provided at one end with a reduced extension of a diameter slidably engaging the bore of the piston pin, and at the opposite end with an enlarged extension of a diameter slidably engaging the bores of the piston bosses, the last named extension being provided at its outer end with an anvil face.

3. A tool for removing and replacing the piston pins and bushings of pistons, comprising a body portion of a diameter slidably engaging in the bore of the bushings with the piston, the body portion being provided at one end with a reduced extension of a diameter slidably engaging the bore of the piston pin, and at the opposite end with an enlarged extension of a diameter slidably engaging the bores of the piston bosses, the first named extension being provided adjacent the body portion with an opening adapted for the reception of a pin of a length greater than the diameter of the extension and less than the diameter of the body portion.

4. A tool for removing and replacing the piston pins and bushings of pistons, comprising a body portion of a diameter slidably engaging in the bore of the bushings with the piston, the body portion being provided at one end with a reduced extension of a diameter slidably engaging the bore of the piston pin, and at the opposite end with an enlarged extension of a diameter slidably engaging the bores of the piston bosses, and an arbor adapted for engagement with the first named extension and having the same external diameter as the enlarged extension.

5. A tool for removing and replacing the piston pins and bushings of pistons, comprising a body portion of a diameter slidably engaging in the bore of the bushings with the piston, the body portion being provided at one end with a reduced extension of a diameter slidably engaging the bore of the piston pin, and at the opposite end with an enlarged extension of a diameter slidably engaging the bores of the piston bosses, and an arbor adapted for engagement with the first named extension and having the same external diameter as the enlarged extension, the arbor being provided with a reduced extension at its outer end of a diameter equal to the diameter of the body portion.

6. A tool for removing and replacing the piston pins and bushings of pistons, comprising a body portion of a diameter slidably engaging in the bore of the bushings with the piston, the body portion being provided at one end with a reduced extension of a diameter slidably engaging the bore of the piston pin, and at the opposite end with an enlarged extension of a diameter slidably engaging the bores of the piston bosses, the first named extension being provided adjacent the body portion with an opening adapted for the reception of a pin of a length greater than the diameter of the extension and less than the diameter of the body portion, the reduced extension having the outer end split and slightly spread, the last named extension being provided adjacent its outer end with an opening adapted for the reception of a lever pin.

In testimony whereof I hereunto affix my signature.

ALFRED BRUNO SEPPMANN.